(12) United States Patent
Garcia Briz et al.

(10) Patent No.: US 9,929,606 B2
(45) Date of Patent: Mar. 27, 2018

(54) INTEGRATION OF POSITIONING ANTENNAS IN WIRELESS INDUCTIVE CHARGING POWER APPLICATIONS

(71) Applicant: QUALCOMM Incorporated, San Diego, CA (US)

(72) Inventors: Alberto Garcia Briz, Munich (DE); Milenko Stamenic, Neubiberg (DE)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 15/136,454

(22) Filed: Apr. 22, 2016

(65) Prior Publication Data

US 2016/0336818 A1 Nov. 17, 2016

Related U.S. Application Data

(60) Provisional application No. 62/159,875, filed on May 11, 2015.

(51) Int. Cl.
*H01F 27/42* (2006.01)
*H01F 37/00* (2006.01)
(Continued)

(52) U.S. Cl.
CPC ............. *H02J 50/90* (2016.02); *B60L 11/182* (2013.01); *B60L 11/1829* (2013.01);
(Continued)

(58) Field of Classification Search
USPC ...................................... 307/104; 366/45, 55
See application file for complete search history.

(56) References Cited

U.S. PATENT DOCUMENTS

2009/0167449 A1* 7/2009 Cook ..................... H02J 5/005
331/154
2012/0262002 A1 10/2012 Widmer et al.
(Continued)

FOREIGN PATENT DOCUMENTS

DE 102014202747 A1 8/2015
DE 102013227129 B4 1/2016

OTHER PUBLICATIONS

International Search Report and Written Opinion—PCT/US2016/030444—ISA/EPO—dated Aug. 22, 2016.

*Primary Examiner* — Adam Houston
(74) *Attorney, Agent, or Firm* — Knobbe, Martens, Olson & Bear, LLP

(57) ABSTRACT

An apparatus for determining a position between a wireless power transmitter and a wireless power receiver is provided. The apparatus comprises a first ferrite block having respective portions configured to be disposed in physical contact with each of adjacent second and third ferrite blocks separated by a first gap and with each of adjacent fourth and fifth ferrite blocks separated by a second gap. The apparatus further comprises a plurality of detection loops wrapped around the first ferrite block such that none of the plurality of detection loops physically contact the second, third, fourth or fifth ferrite blocks when the respective portions of the first ferrite block are in physical contact with the second, third, fourth or fifth ferrite blocks. Each of the plurality of detection loops are wrapped around the first ferrite block in mutually perpendicular planes from one another.

30 Claims, 9 Drawing Sheets

(51) Int. Cl.
    *H01F 38/00*     (2006.01)
    *H02J 50/90*     (2016.01)
    *H02J 50/10*     (2016.01)
    *H01F 38/14*     (2006.01)
    *B60L 11/18*     (2006.01)

(52) U.S. Cl.
    CPC .......... *B60L 11/1833* (2013.01); *H01F 38/14* (2013.01); *H02J 50/10* (2016.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | |
|---|---|---|
| 2013/0320759 A1 | 12/2013 | Abe et al. |
| 2014/0070622 A1 | 3/2014 | Keeling et al. |
| 2014/0361630 A1* | 12/2014 | Boys ............... H01F 27/365 307/104 |
| 2015/0008751 A1* | 1/2015 | Widmer ............. H01F 38/14 307/104 |
| 2015/0091388 A1* | 4/2015 | Golko ............... H01F 7/206 307/104 |
| 2015/0170832 A1* | 6/2015 | Covic ............... H01F 27/38 307/104 |
| 2015/0207332 A1* | 7/2015 | Honda .............. H01F 38/14 320/108 |
| 2015/0279555 A1* | 10/2015 | Chiyo ............... H01F 38/14 307/104 |
| 2015/0372507 A1* | 12/2015 | Kagami ............. H01F 38/14 307/104 |
| 2016/0025821 A1 | 1/2016 | Widmer et al. |
| 2016/0099577 A1* | 4/2016 | Park ................. H02J 50/12 307/104 |
| 2016/0141099 A1* | 5/2016 | Maekawa .......... H01F 38/14 307/104 |
| 2016/0181819 A1* | 6/2016 | Kautz ............... H02J 5/005 320/108 |
| 2016/0181821 A1* | 6/2016 | Xu ................... H01F 27/24 307/104 |
| 2016/0189848 A1* | 6/2016 | Nam ................. H01F 38/14 307/104 |
| 2016/0189861 A1* | 6/2016 | Nam ................. H02J 50/10 307/104 |
| 2016/0204621 A1* | 7/2016 | Urano ............... H01F 38/14 307/104 |
| 2016/0336818 A1* | 11/2016 | Garcia Briz ....... H02J 50/90 |
| 2016/0341573 A1* | 11/2016 | Widmer ............ H01F 38/14 |

\* cited by examiner

INTEGRATION OF POSITIONING ANTENNAS IN WIRELESS INDUCTIVE CHARGING POWER APPLICATIONS

PRIORITY CLAIM

The present application for patent claims priority to Provisional Application No. 62/159,875 entitled "INTEGRATION OF SOLENOID POSITIONING ANTENNAS IN WIRELESS INDUCTIVE CHARGING POWER APPLICATIONS" filed May 11, 2015, and assigned to the assignee hereof. Provisional Application No. 62/159,875 is hereby expressly incorporated by reference herein.

FIELD

This application is generally related to wireless charging power transfer applications, and more specifically to integration of positioning antennas in wireless inductive charging power applications.

BACKGROUND

Efficiency in wireless inductive charging power applications depends at least in part on achieving at least a minimum alignment threshold between a wireless power transmitter and a wireless power receiver. One method for aiding such alignment is the use of magnetic vectoring, where a distance and/or direction between the wireless power transmitter and the wireless power receiver is determined based on sensing one or more attributes of a magnetic field generated by either the wireless power transmitter or the wireless power receiver. However, sensitivity of such a magnetic vectoring method may depend at least in part upon the positioning sensors, coils or antennas being disposed in close proximity to the ferrite of the wireless power transmitter. Accordingly, integration of positioning antennas in wireless inductive charging power applications as described herein are desirable.

SUMMARY

According to some implementations, an apparatus for determining a position between a wireless power transmitter and a wireless power receiver is provided. The apparatus comprises a first ferrite block having respective portions configured to be disposed in physical contact with each of adjacent second and third ferrite blocks separated by a first gap and with each of adjacent fourth and fifth ferrite blocks separated by a second gap. The apparatus comprises a plurality of detection loops wrapped around the first ferrite block such that none of the plurality of detection loops physically contact the second, third, fourth or fifth ferrite blocks when the respective portions of the first ferrite block are in physical contact with the second, third, fourth or fifth ferrite blocks.

In some other implementations, a method for determining relative positions between a wireless charging power transmitter and a wireless charging power receiver is provided. The method comprises sensing, utilizing each of a plurality of detection loops wrapped around a first ferrite block, amounts of magnetic flux in the first ferrite block flowing in respective directions normal to planes in which the plurality of detection loops are wound. The method comprises determining the position between the wireless power transmitter and the wireless power receiver based at least in part on the sensed amounts of magnetic flux. The first ferrite block comprises respective portions configured to be disposed in physical contact with each of adjacent second and third ferrite blocks separated by a first gap and with each of adjacent fourth and fifth ferrite blocks separated by a second gap. The plurality of detection loops are wrapped around the first ferrite block such that none of the plurality of detection loops physically contact the second, third, fourth or fifth ferrite blocks when the respective portions of the first ferrite block are in physical contact with the second, third, fourth or fifth ferrite blocks.

In yet other implementations, a method for fabricating an apparatus for determining a position between a wireless power transmitter and a wireless power receiver is provided. The method comprises wrapping each of a plurality of detection loops around a first ferrite block. The method comprises disposing the first ferrite block such that respective portions of the first ferrite block are in physical contact with each of adjacent second and third ferrite blocks separated by a first gap and with each of adjacent fourth and fifth ferrite blocks separated by a second gap. The plurality of detection loops are wrapped around the first ferrite block such that none of the plurality of detection loops physically contact the second, third, fourth or fifth ferrite blocks.

In yet other implementations, an apparatus for determining a position between a wireless power transmitter and a wireless power receiver is provided. The apparatus comprises first means for channeling magnetic flux having respective portions configured to be disposed in physical contact with each of adjacent second and third means for channeling magnetic flux separated by a first gap and with each of adjacent fourth and fifth means for channeling magnetic flux separated by a second gap. The apparatus further comprises a plurality of means for detecting magnetic flux wrapped around the first means for channeling magnetic flux such that none of the plurality of means for detecting magnetic flux physically contact the second, third, fourth or fifth means for channeling magnetic flux when the respective portions of the first means for channeling magnetic flux are in physical contact with the second, third, fourth or fifth means for channeling magnetic flux.

DETAILED DESCRIPTION

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured, or coupled by a "receive coupler" to achieve power transfer.

The terminology used herein is for the purpose of describing particular implementations only and is not intended to be limiting on the disclosure. It will be understood that if a specific number of a claim element is intended, such intent will be explicitly recited in the claim, and in the absence of such recitation, no such intent is present. For example, as used herein, the singular forms "a," "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Figure 1:
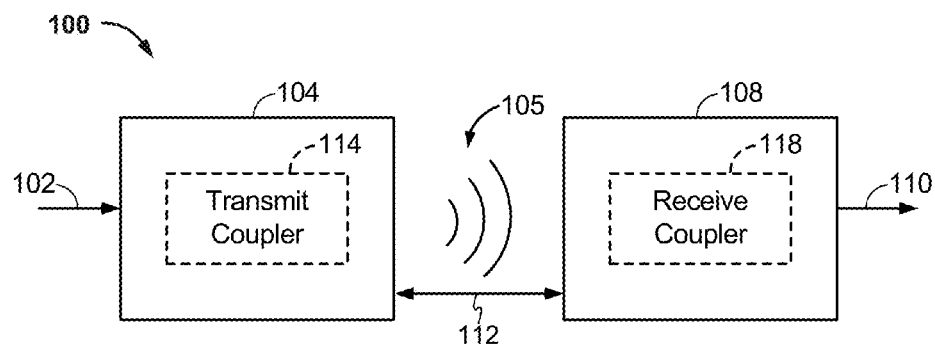
FIG. 1 is a functional block diagram of a wireless power transfer system, in accordance with some implementations.

FIG. 1 is a functional block diagram of a wireless power transfer system 100, in accordance with some implementations. Input power 102 may be provided to a transmitter 104 from a power source (not shown) to generate a wireless (e.g., magnetic or electromagnetic) field 105 via a transmit coupler 114 for performing energy transfer. The receiver 108 may receive power when the receiver 108 is located in the wireless field 105 produced by the transmitter 104. The wireless field 105 corresponds to a region where energy output by the transmitter 104 may be captured by the receiver 108. A receiver 108 may couple to the wireless field 105 and generate output power 110 for storing or consumption by a device (not shown in this figure) coupled to the output power 110. Both the transmitter 104 and the receiver 108 are separated by a distance 112.

In one example implementation, power is transferred inductively via a time-varying magnetic field generated by the transmit coupler 114. The transmitter 104 and the receiver 108 may further be configured according to a mutual resonant relationship. When the resonant frequency of the receiver 108 and the resonant frequency of the transmitter 104 are substantially the same or very close, transmission losses between the transmitter 104 and the receiver 108 are minimal. However, even when resonance between the transmitter 104 and receiver 108 are not matched, energy may be transferred, although the efficiency may be reduced. For example, the efficiency may be less when resonance is not matched. Transfer of energy occurs by coupling energy from the wireless field 105 of the transmit coupler 114 to the receive coupler 118, residing in the vicinity of the wireless field 105, rather than propagating the energy from the transmit coupler 114 into free space. Resonant inductive coupling techniques may thus allow for improved efficiency and power transfer over various distances and with a variety of inductive coupler configurations.

In some implementations, the wireless field 105 corresponds to the "near-field" of the transmitter 104. The near-field may correspond to a region in which there are strong reactive fields resulting from the currents and charges in the transmit coupler 114 that minimally radiate power away from the transmit coupler 114. The near-field may correspond to a region that is within about one wavelength (or a fraction thereof) of the transmit coupler 114. Efficient energy transfer may occur by coupling a large portion of the energy in the wireless field 105 to the receive coupler 118 rather than propagating most of the energy in an electromagnetic wave to the far field. When positioned within the wireless field 105, a "coupling mode" may be developed between the transmit coupler 114 and the receive coupler 118.

Figure 2:
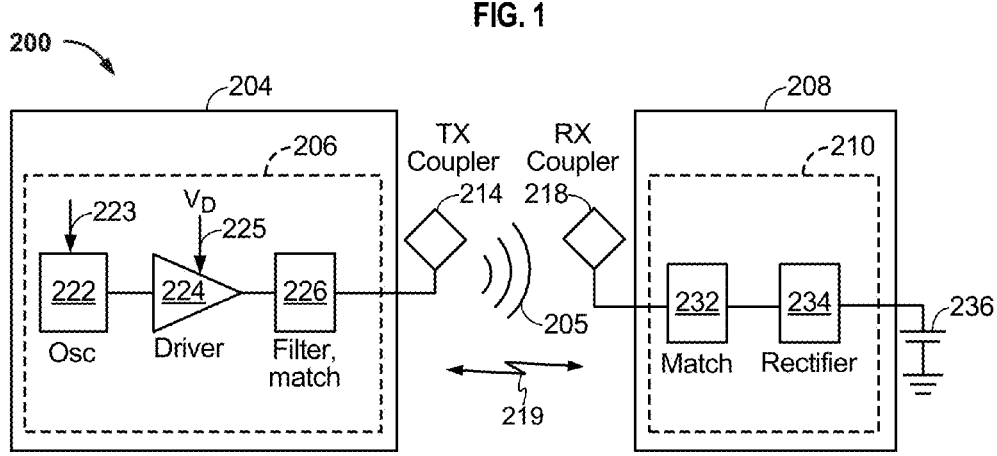
FIG. 2 is a functional block diagram of a wireless power transfer system, in accordance with some other implementations.

FIG. 2 is a functional block diagram of a wireless power transfer system 200, in accordance with some other implementations. The system 200 may be a wireless power transfer system of similar operation and functionality as the system 100 of FIG. 1. However, the system 200 provides additional details regarding the components of the wireless power transfer system 200 as compared to FIG. 1. The system 200 includes a transmitter 204 and a receiver 208. The transmitter 204 includes transmit circuitry 206 that includes an oscillator 222, a driver circuit 224, and a filter and matching circuit 226. The oscillator 222 may be configured to generate a signal at a desired frequency that may be adjusted in response to a frequency control signal 223. The oscillator 222 provides the oscillator signal to the driver circuit 224. The driver circuit 224 may be configured to drive the transmit coupler 214 at a resonant frequency of the transmit coupler 214 based on an input voltage signal ($V_D$) 225.

The filter and matching circuit 226 filters out harmonics or other unwanted frequencies and matches the impedance of the transmit circuitry 206 to the transmit coupler 214. As a result of driving the transmit coupler 214, the transmit coupler 214 generates a wireless field 205 to wirelessly output power at a level sufficient for charging a battery 236.

The receiver 208 comprises receive circuitry 210 that includes a matching circuit 232 and a rectifier circuit 234. The matching circuit 232 may match the impedance of the receive circuitry 210 to the impedance of the receive coupler 218. The rectifier circuit 234 may generate a direct current (DC) power output from an alternate current (AC) power input to charge the battery 236. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205. In some implementations, the receiver 208 may be configured to determine whether an amount of power transmitted by the transmitter 204 and received by the receiver 208 is appropriate for charging the battery 236.

Figure 3:
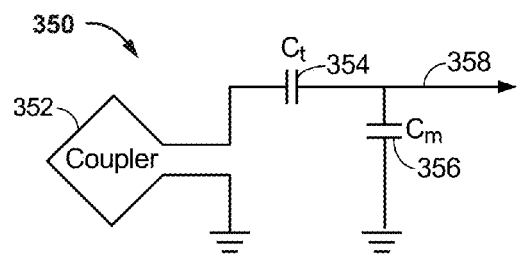
FIG. 3 is a schematic diagram of a portion of transmit circuitry or receive circuitry of FIG. 2 including a transmit or receive coupler, in accordance with some implementations.

FIG. 3 is a schematic diagram of a portion of the transmit circuitry 206 or the receive circuitry 210 of FIG. 2, in accordance with some implementations. As illustrated in FIG. 3, transmit or receive circuitry 350 may include a coupler 352. The coupler 352 may also be referred to or be configured as a "conductor loop", a coil, an inductor, or a "magnetic" coupler. The term "coupler" generally refers to a component that may wirelessly output or receive energy for coupling to another "coupler."

The resonant frequency of the loop or magnetic couplers is based on the inductance and capacitance of the loop or magnetic coupler. Inductance may be simply the inductance created by the coupler 352, whereas, capacitance may be added via a capacitor (or the self-capacitance of the coupler 352) to create a resonant structure at a desired resonant frequency, or at a fixed frequency set or prescribed by a particular operations standard. As a non-limiting example, a capacitor 354 and a capacitor 356 may be added to the transmit or receive circuitry 350 to create a resonant circuit that is configured to resonate at a resonant frequency. For larger sized couplers using large diameter couplers exhibiting larger inductance, the value of capacitance needed to produce resonance may be lower. Furthermore, as the size of the coupler increases, coupling efficiency may increase. This is mainly true if the size of both transmit and receive couplers increase. For transmit couplers, the signal 358, oscillating at a frequency that substantially corresponds to the resonant frequency of the coupler 352, may be an input to the coupler 352. For receive couplers, the signal 358 may be output to power or charge a load.

Figure 4:
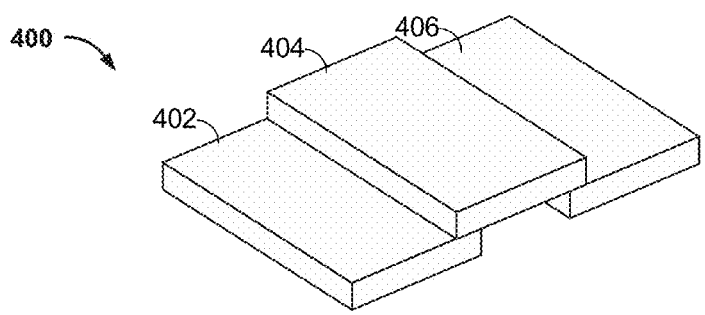
FIG. 4 is an isometric illustration of a plurality of ferrite blocks of a wireless power transfer system similar to that discussed in connection with any of FIGS. 1-3, in accordance with some implementations.

FIG. 4 is an isometric illustration 400 of a plurality of ferrite blocks 402, 404, 406 of a wireless power transfer system similar to that discussed in connection with any of FIGS. 1-3, in accordance with some implementations. As shown in FIG. 4, a wireless power transfer system (e.g., either a wireless power receiver or a wireless power transmitter) may comprise a first ferrite block 402 around or on which may be wound a first coil (see FIG. 5), a second ferrite block 406 around or on which may be wound a second coil (see FIG. 5), and a third ferrite block 404 around or on which may be wound detection loops in each of 3 mutually perpendicular directions (e.g., X-direction, Y-direction, and Z-direction, see FIGS. 7 and 8) for detecting a position and/or direction between the wireless power transmitter and the wireless power receiver via magnetic vectoring (e.g., sensing magnetic fields in different orientations to determine a positioning vector between a receiver and a transmitter). The third ferrite block 404 may be disposed over and in physical contact with at least a portion of each of the first ferrite block 402 and the second ferrite block 406. In this way magnetic flux guided by each of the first ferrite block 402, the second ferrite block 406, and the third ferrite block 404 may flow through a physically uninterrupted path through each of the first ferrite block 402, the third ferrite block 404, and the second ferrite block 406.

Figure 5:
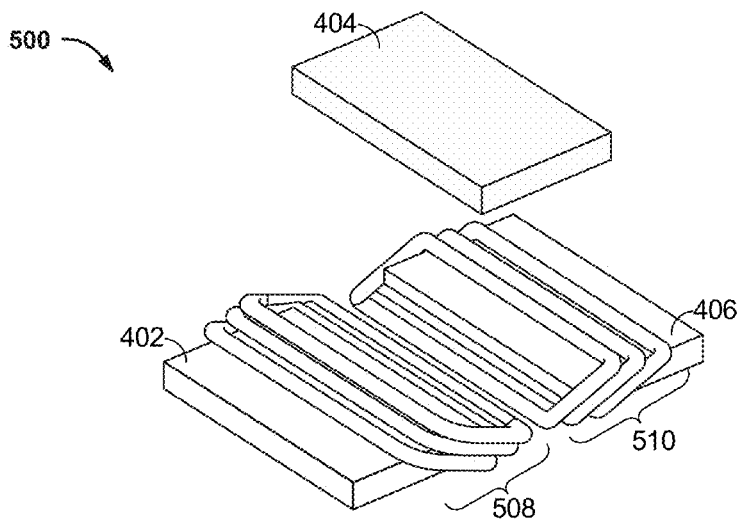
FIG. 5 is an exploded isometric illustration of the plurality of ferrite blocks of FIG. 4 further including wireless power transfer coils similar to those discussed in connection with any of FIGS. 1-3, in accordance with some implementations.

FIG. 5 is an exploded isometric illustration 500 of the plurality of ferrite blocks 402, 404, 406 of FIG. 4 further including wireless power transmission coils 508, 510 similar to those discussed in connection with any of FIGS. 1-3, in accordance with some implementations. FIG. 5 shows the third ferrite block 404 disposed some distance above the first ferrite block 402 and the second ferrite block 406 for ease of visualization. A first coil 508 may be wrapped around the first ferrite block 402. The first coil 508 may be a portion of a hybrid solenoid-double-D configuration characterized by the plurality of windings of the first coil 508 being wound askew (e.g., at an angle) with respect to the top and bottom surfaces of the first ferrite block 402. A second coil 510 may be similarly wrapped around the second ferrite block 406. The second coil 510 may be another portion of the hybrid solenoid-double-D configuration as described above with respect to the first coil 508 and the first ferrite block 402.

Figure 6:
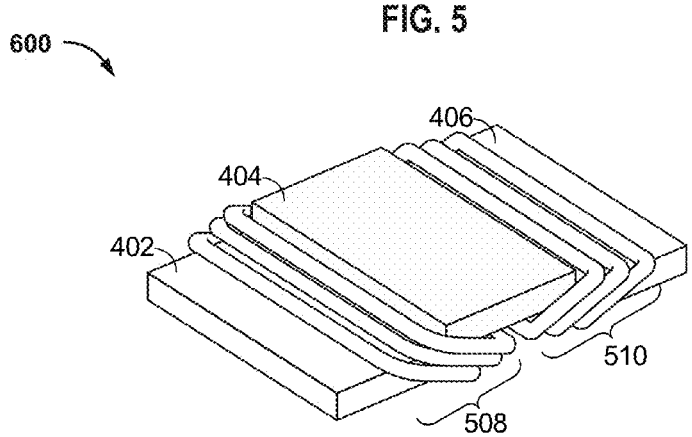
FIG. 6 is a collapsed isometric illustration of FIG. 5.

FIG. 6 is a collapsed isometric illustration 600 of FIG. 5. As shown in FIG. 6, the first coil 508 is wound around the first ferrite block 402 in the hybrid solenoid-double-D configuration and the second coil 510 is wound around the second ferrite block 406 in the same configuration. The third ferrite block 404 is shown as being disposed over and in physical contact with at least a portion of each of the first ferrite block 402 and the second ferrite block 406, as previously described in connection with FIG. 4.

Figure 7:
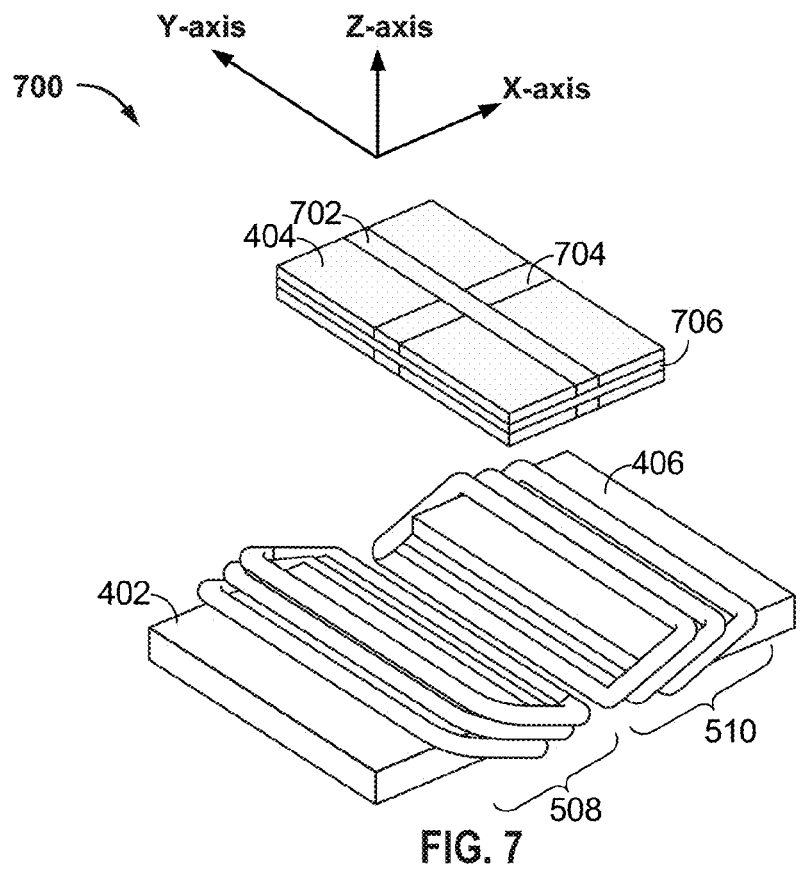
FIG. 7 is an exploded isometric illustration of the plurality of ferrite blocks and wireless power transmission coils of FIG. 5 further including 3 dimensional detection loops, in accordance with some implementations.

FIG. 7 is an exploded isometric illustration 700 of the plurality of ferrite blocks 402, 404, 406 and wireless power transmission coils 508, 510 of FIG. 5, further including 3 dimensional detection loops 702, 704, 706, in accordance with some implementations. FIG. 7 shows the third ferrite block 404 disposed some distance above the first ferrite block 402 and the second ferrite block 406 for ease of visualization. A first detection loop 702 is wound around the third ferrite block 404 along a Y-axis (and also a perpendicular Z-axis) such that a cross section of the first detection loop 702 (in a plane comprising the Y and Z axes) encloses magnetic flux passing through the third ferrite block 404 along a mutually perpendicular X-axis. A second detection loop 704 is wound around the third ferrite block 404 along the X-axis (and also the perpendicular Z-axis) such that a cross section of the second detection loop 704 (in a plane comprising the X and Z axes) encloses magnetic flux passing through the third ferrite block 404 along the the mutually perpendicular Y-axis. A third detection loop 706 is wound around an edge of the third ferrite block 404 (e.g., along both the X-axis and the Y-axis) such that a cross section of the third detection loop 706 encloses magnetic flux passing through the third ferrite block 404 along a mutually perpendicular Z-axis. Accordingly, each of the detection loops 702, 704, and 706 can be configured to sense an amount of magnetic flux flowing in a respective direction normal to a plane in which the respective detector loop is wound. Although three detection loops 702, 704, 706 are shown and described, the present application further contemplates configurations utilizing any two of these three detection loops 702, 704, 706. These X-, Y-, and Z-components of the magnetic flux will be described in more detail in connection with other implementations shown in FIGS. 9-15. In some implementations, each of the first detection loop 702, the second detection loop 704 and the third detection loop 706 may be solenoids formed from flexible printed circuits (FPCs) or ribbon cable.

Figure 8:
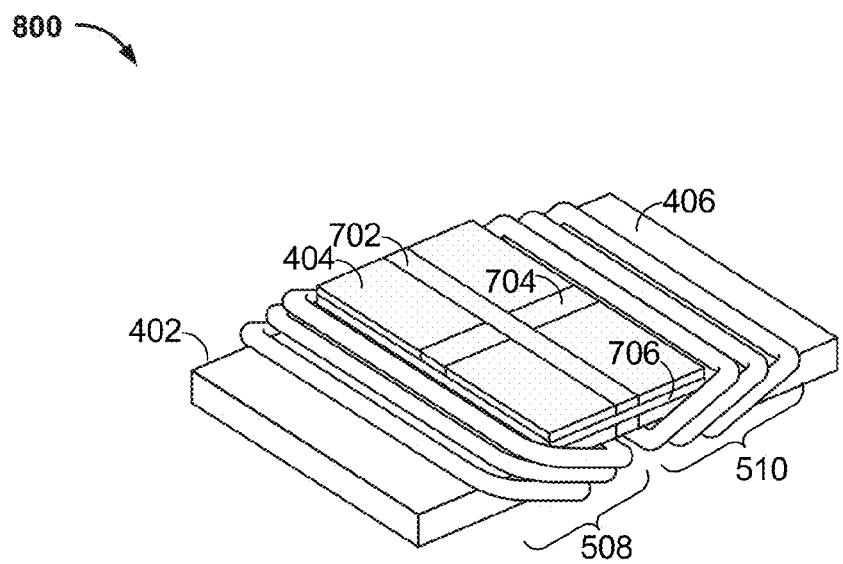
FIG. 8 is a collapsed isometric illustration of FIG. 7.

FIG. 8 is a collapsed isometric illustration 800 of FIG. 7, where the third ferrite block 404 is shown in contact with at least a portion of each of the first ferrite block 402 and the second ferrite block 406.

The use of separate ferrite block portions (e.g., the first ferrite block 402, the second ferrite block 406 and the third ferrite block 404) as shown in each of FIGS. 4-8, rather than a single larger ferrite block, allows for separate manufacture of the hybrid solenoid-double-D coil structure (e.g., the first ferrite block 402, the second ferrite block 406, the first coil 508 and the second coil 510) and the magnetic vectoring sensing configuration (e.g., the third ferrite block 404, the first detection loop 702, the second detection loop 704, and the third detection loop 706). In addition, since the magnetic flux passing through each of the first ferrite block 402 and the second ferrite block 406 are provided an exclusive path to flow through the third ferrite block 404, by virtue of the physical contact between the third ferrite block 404 and each of the first ferrite block 402 and the second ferrite block 406, the detection loops 702, 704, 706 may be made smaller, being wound only around the smaller third ferrite block 404 (as opposed to being wound around a larger single ferrite block spanning the first coil 508 and the second coil 510).

However, as shown in FIG. 8, the second detection loop 704 will extend to the underside of the third ferrite block 404 and will substantially be in contact with the first ferrite block 402 and the second ferrite block 406 at the portions of physical contact between the third ferrite block 404 and each of the first and second ferrite blocks 402, 406. Even if the detection loop 704 is electrically insulated from the first and second ferrite blocks 402, 406 this may have adverse effects on the sensitivity and performance of the detection loops. Thus, the present application contemplates implementations where the first ferrite block 402 and the second ferrite block 406 are bisected into two portions such that a gap is provided immediately adjacent to (e.g., immediately above or below) the detection loops.

Figure 9:
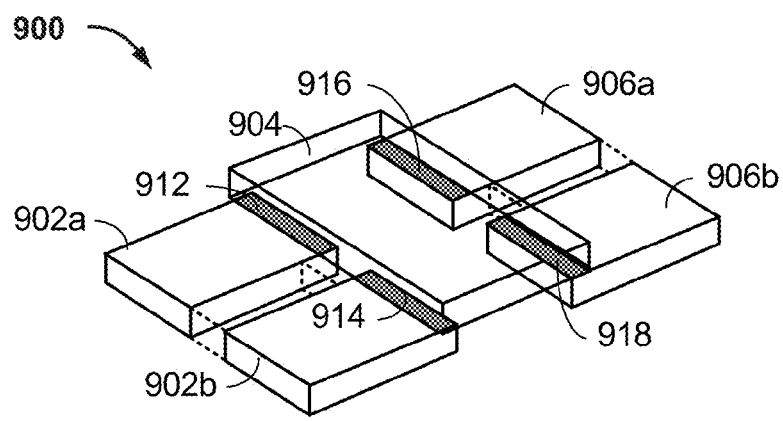
FIG. 9 is an isometric illustration of a plurality of bisected ferrite blocks for a wireless power transfer system similar to that discussed in connection with FIGS. 1-3, in accordance with some implementations.

FIG. 9 is an isometric illustration 900 of a plurality of bisected ferrite blocks 902a, 902b, 906a, 906b for a wireless power transfer system similar to that discussed in connection with FIGS. 1-3, in accordance with some implementations. FIG. 9 shows a second ferrite block 902a disposed adjacent to a third ferrite block 902b. A gap is defined separating the second ferrite block 902a from the third ferrite block 902b. FIG. 9 additionally shows a fourth ferrite block 906a disposed adjacent to a fifth ferrite block 906b. A gap is defined separating the fourth ferrite block 906a from the fifth ferrite block 906b. FIG. 9 further shows a first ferrite block 904 disposed over and in physical contact with at least a portion of each of the second ferrite block 902a, the third ferrite block 902b, the fourth ferrite block 906a and the fifth ferrite block 906b. These portions are shown as portions 912, 914, 916 and 918, respectively. In this way magnetic flux guided by each of the second through fifth ferrite blocks 902a, 902b, 906a, 906b may flow through an exclusive uninterrupted path through the first ferrite block 904. The present application also contemplates implementations where the second and third ferrite blocks 902a, 902b are a single ferrite block, having a slot or notch defined for at least the portion of the single ferrite block that would otherwise be in physical contact with a second detection loop 1104 (see FIGS. 11 and 12), as shown by the dotted lines in FIG. 9. These implementations would similarly include a single ferrite block for the fourth and fifth ferrites blocks 906a, 906b, including a similar slot or notch as previously described with respect to the second and third ferrite blocks 902a, 902b. In yet other implementations, the first ferrite block 904 is not in contact with the one or more of the second through fourth ferrite blocks 902a, 902b, 906a, 906b. However, such an implementation would operate at a substantially lower efficiency and sensitivity as compared to implementations where the first ferrite block 904 is in direct physical contact with the second through fourth ferrite blocks 902a, 902b, 906a, 906b. Such implementations may equally apply to the following description for FIGS. 10-15.

In some implementations, the first ferrite block 904 may also be known as, or comprise at least a portion of first means for channeling magnetic flux. Likewise, each of the second, third, fourth and fifth ferrite blocks 902a, 902b, 906a, 906b may also be known as, or comprise at least a portion of second, third, fourth and fifth means for channeling magnetic flux, respectively.

Figure 10:
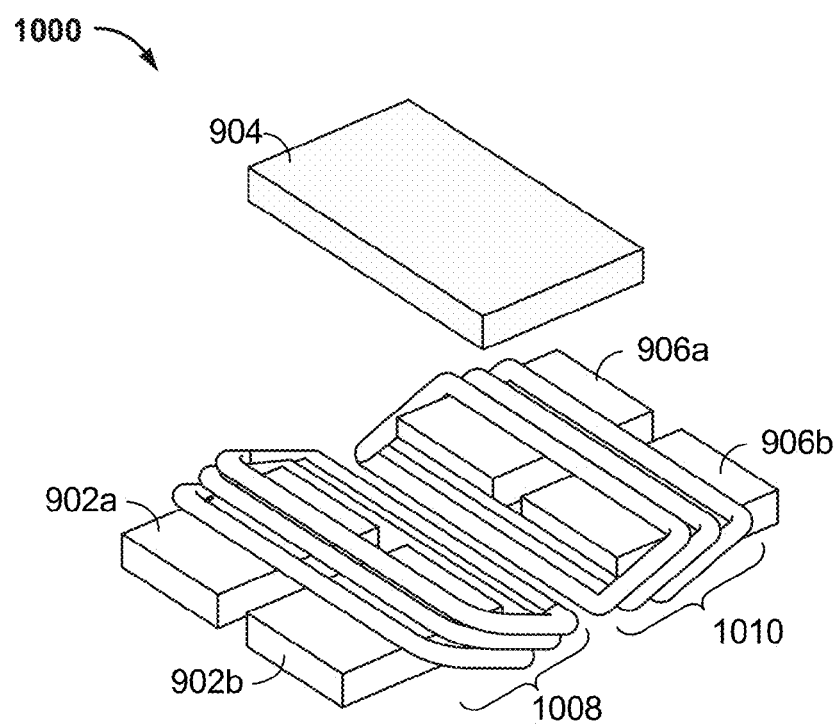
FIG. 10 is an exploded isometric illustration of the plurality of bisected ferrite blocks of FIG. 9 including wireless power transmission coils similar to those discussed in connection with any of FIGS. 1-3, in accordance with some implementations.

FIG. 10 is an exploded isometric illustration 1000 of the plurality of bisected ferrite blocks 902a, 902b, 906a, 906b of FIG. 9 including wireless power transmission coils similar to those discussed in connection with any of FIGS. 1-3, in accordance with some implementations. FIG. 9 shows the first ferrite block 904 disposed some distance above the first through fourth ferrite blocks 902a, 902b, 906a, 906b for ease of visualization. A first coil 1008 may be wrapped around the second and third ferrite blocks 902a, 902b. The first coil 1008 may be a portion of a hybrid solenoid-double-D configuration as previously described in connection with FIG. 5. Similarly, a second coil 1010 may be wrapped around the fourth and fifth ferrites blocks 906a, 906b. The second coil 1010 may be another portion of the hybrid solenoid-double-D configuration described above with respect to the first coil 1008 and the second and third ferrite blocks 902a, 902b. In some implementations, the first coil 1008 may also be known as, or comprise at least a portion of first means for wirelessly transferring power. Likewise, the second coil 1010 may also be known as, or comprise at least a portion of second means for wirelessly transferring power.

Figure 11:
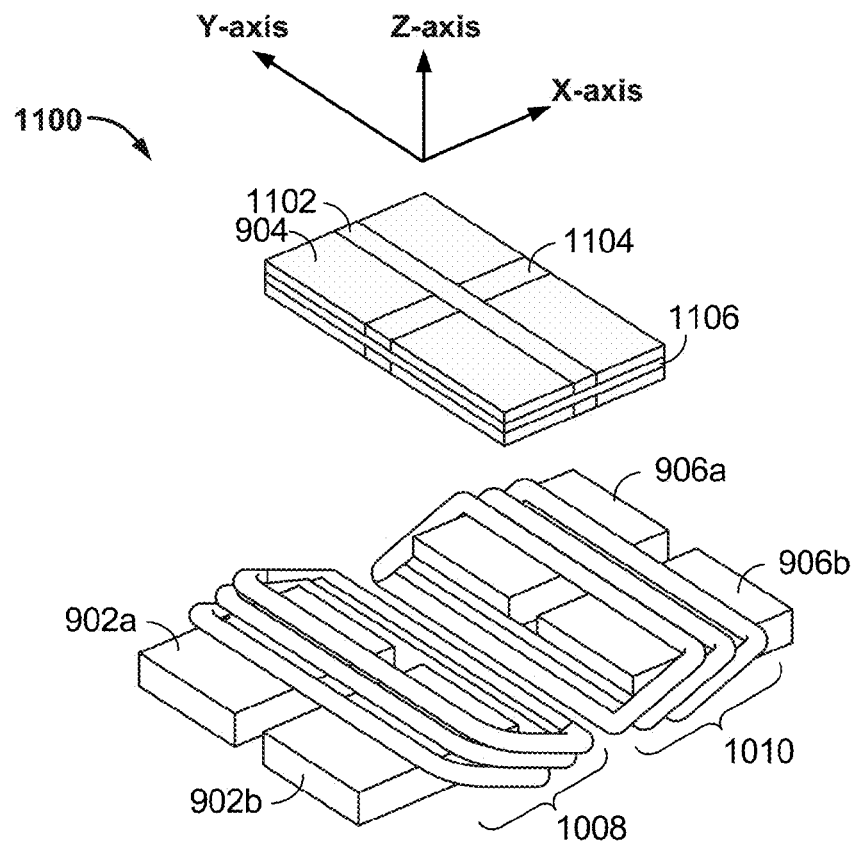
FIG. 11 is an exploded isometric illustration of the plurality of bisected ferrite blocks and wireless power transmission coils of FIG. 10 further including 3 dimensional detection loops, in accordance with some implementations.

FIG. 11 is an exploded isometric illustration 1100 of the plurality of bisected ferrite blocks 902a, 902b, 906a, 906b and wireless power transmission coils 1008, 1010 of FIG. 10 further including 3 dimensional detection loops 1102, 1104, 1106, in accordance with some implementations. A first detection loop 1102 is wound around the first ferrite block 904 along a Y-axis (and also a perpendicular Z-axis) such that a cross section of the first detection loop 1102 (in a plane comprising the Y and Z axes) encloses magnetic flux passing through the first ferrite block 904 along a mutually perpendicular X-axis. A second detection loop 1104 is wound around the first ferrite block 904 along the X-axis (and also the perpendicular Z-axis) such that a cross section of the second detection loop 1104 (in a plane comprising the X and Z axes) encloses magnetic flux passing through the first ferrite block 904 along the mutually perpendicular Y-axis. A third detection loop 1106 is wound around an edge of the first ferrite block 904 (e.g., along both the X-axis and the Y-axis) such that a cross section of the fifth detection loop 1106 (in a plane comprising the X and Y axes) encloses magnetic flux passing through the first ferrite block 904 along the mutually perpendicular Z-axis. These X-, Y-, and Z-components of the magnetic flux will be described in more detail in connection with FIGS. 13-15. In some implementations, each of the first detection loop 1102, the second detection loop 1104 and the third detection loop 1106 may be solenoids formed from flexible printed circuits (FPCs) or ribbon cable.

In some implementations, the first, second and third detection loops 1102, 1104, 1106 may also be known as, or comprise at least a portion of first, second and third means for detecting magnetic flux, respectively.

Figure 12:
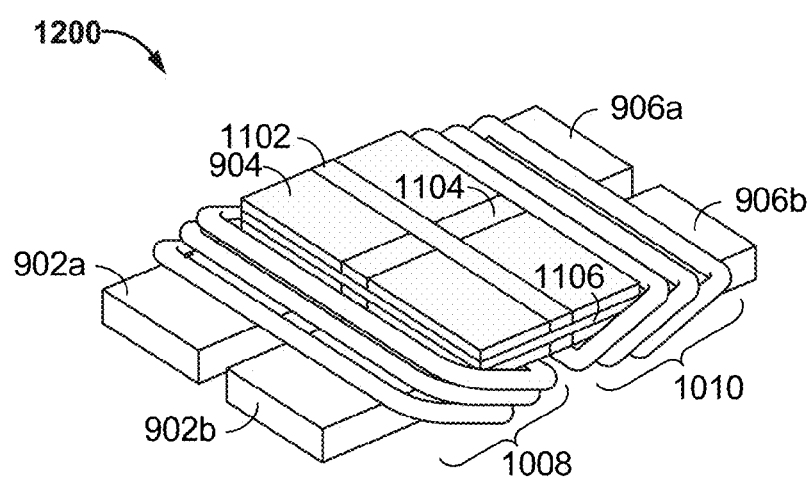
FIG. 12 is a collapsed isometric illustration of FIG. 11.

FIG. 12 is a collapsed isometric illustration 1200 of FIG. 11, where the first ferrite block 904 is shown in contact with at least a portion of each of the first through fourth ferrite blocks 902a, 902b, 906a, 906b. Although three detection loops 1102, 1104, 1106 are shown in FIG. 11, any number of detection loops may be implemented (e.g., any two of the detection loops 1102, 1104, 1106).

A brief explanation of the operating principle by which magnetic vectoring may be utilized for determining a distance and/or direction between a wireless power transmitter and a wireless power receiver of a wireless power transfer system follows. At least one coil within the wireless power transmitter or the wireless power receiver may generate a magnetic field by driving respective coil(s) with an alternating electric current. This magnetic field may be a different magnetic field from that utilized for wireless power transfer. This magnetic field will have components in each of arbitrarily established, mutually perpendicular X-, Y-, and Z-directions or axes. For implementations where the magnetic vectoring detector loops are disposed in or near the wireless power transmitter or the wireless power receiver that is not generating the positioning magnetic field, the X-, Y- and Z-components of the magnetic field may be detected by the respectively oriented detection loops as the magnetic field extends to and is channeled through the ferrite block around which the detection loops are wrapped, by virtue of the ferrite blocks providing a low reluctance path for the magnetic fields. By measuring the relative strength, or a change in the relative strength, of each of the X-, Y-, and Z-components of this magnetic field with respect to one another, and/or with respect to respective known reference values for each component, a direction and distance from the detector loops to the coil generating the magnetic field may be calculated or determined.

For implementations where the magnetic vectoring detectoion loops are disposed in or near the one of the wireless power transmitter or wireless power receiver that is generating the positioning magnetic field, the X-, Y- and Z-components of the magnetic field may be detected by the respectively oriented detection loops as the magnetic field extends to and is channeled through the ferrite block around which the detection loops are wrapped, by virtue of the ferrite blocks providing a low reluctance path for the magnetic fields. The wireless power transmitter or wireless power receiver that is not generating the magnetic field, but which is located within the generated magnetic field, may alter the shape and strength of the magnetic field (and hence the relative strengths of each of the X-, Y, and Z-components of that magnetic field) by virtue of its coil and/or ferrite blocks providing a low reluctance path for portions of the magnetic flux to flow through, as compared to the air or current physical environment.

By measuring the relative strength, or change in relative strength, of each of the X-, Y-, and Z-components of this magnetic field with respect to one another, and/or with respect to respective known reference values for each component, a direction and distance from the detector loops to the coil not generating the magnetic field or associated ferrite blocks may be calculated or determined.

In some non-limiting implementations, the positioning magnetic field (e.g., magnetic field beacons) may be generated by vehicles entering a parking lot or nearing a parking space to charge the vehicle. This decreases the likelihood of interference and coexistence issues that may be experienced when multiple such vehicles are present. In such implementations, any pre-amplifier circuitry associated with the plurality of detection loops may be disposed within the base pad (e.g., the wireless power transmitter), which may provide increased packaging flexibility as compared to location within the vehicle pad (e.g., the wireless power receiver). In such implementations, one or more relays (not shown) may be utilized within the vehicle (e.g., with the wireless power receiver) to magnetically decouple the plurality of detection loops from the receive coils within the vehicle pad. Furthermore, in such implementations, the magnetic vectoring system may provide X and Y positioning information of the vehicle pad with respect to the base pad to a driver of the vehicle via a user interface. In some other implementations, the magnetic vectoring system may provide angle and distance positioning information of the vehicle pad with respect to the base pad to a driver of the vehicle via a user interface. In some implementations, this positioning information may be updated periodically (e.g., every 5 seconds) and some mechanism for wireless communication pairing between the vehicle and a particular charging station may be instituted.

The flow of each of the X-, Y-, and Z-components of the above-described magnetic field through the ferrite blocks associated with these detector loops are described in more detail in connection with FIG. 13.

Figure 13:
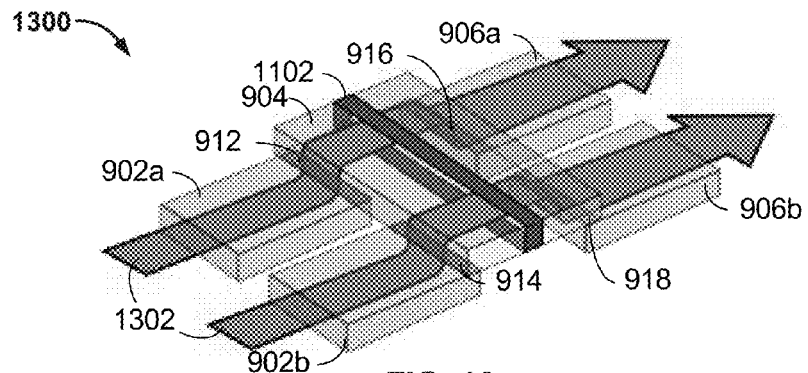
FIG. 13 is an isometric illustration of magnetic flux channeled through the bisected ferrite blocks of FIG. 11 in an X-direction, detectable by one of the 3 dimensional detection loops of FIG. 11, in accordance with some implementations.

FIG. 13 is an isometric illustration 1300 of magnetic flux 1302 passing through the bisected ferrite blocks 902a, 902b, 906a, 906b of FIG. 11 in the X-direction, detectable by one of the 3 dimensional detection loops 1102 of FIG. 11, in accordance with some implementations. As shown in FIG. 13, the second ferrite block 902a is in physical contact with the portion 912 of the first ferrite block 904, the third ferrite block 902b is in physical contact with the portion 912 of the first ferrite block 904, the fourth ferrite block 906a is in physical contact with the portion 916 of the first ferrite block 904, and the fifth ferrite block 906b is in physical contact with the portion 918 of the first ferrite block 904. This allows the magnetic flux 1302 (e.g., X-component) flowing through each of the first through fifth ferrite blocks 902a, 902b, 906a, 906b, 904 to be enclosed and, thus, sensed by the first detection loop 1102. As shown, a gap is defined separating the second ferrite block 902a from the third ferrite block 902b, and another gap is defined separating the fourth ferrite block 906a from the fifth ferrite block 906b.

Thus, in some implementations, a hybrid solenoid-double-D coil arrangement comprising any combination of the first through fourth ferrite blocks 902a, 902b, 906a, 906b, and first and second coils 1008, 1010 may be produced, manufactured, fabricated or constructed. Separately, the first through third detection loops 1102, 1104, 1106 may be wrapped around the first ferrite block 904 to form a detection assembly. The detection assembly may then be placed over the hybrid solenoid-double-D coil arrangement, previously described in connection with FIG. 12, assuring physical contact between the first through fourth ferrite blocks and the fifth ferrite block without causing interference with the detection assembly due to contact or close proximity between any of the first through third detection loops 1102, 1104, 1106 and any of the first through fourth ferrite blocks 902a, 902b, 906a, 906b.

Figure 14:
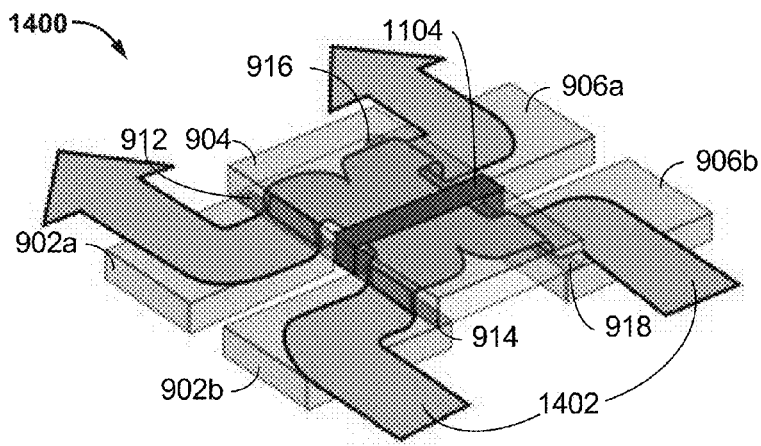
FIG. 14 is an isometric illustration of magnetic flux channeled through the bisected ferrite blocks of FIG. 11 in a Y-direction, detectable by one of the 3 dimensional detection loops of FIG. 11, in accordance with some implementations.

FIG. 14 is an isometric illustration 1400 of magnetic flux 1402 passing through the bisected ferrite blocks 902a, 902b, 906a, 906b of FIG. 11 in a Y-direction, detectable by one of the 3 dimensional detection loops 1104 of FIG. 11, in accordance with some implementations. As shown in FIG. 14, the second ferrite block 902a is in physical contact with the portion 912 of the first ferrite block 904, the third ferrite block 902b is in physical contact with the portion 912 of the first ferrite block 904, the fourth ferrite block 906a is in physical contact with the portion 916 of the first ferrite block 904, and the fifth ferrite block 906b is in physical contact with the portion 918 of the first ferrite block 904. This allows the magnetic flux 1402 (e.g., Y-component) flowing through each of the first through fifth ferrite blocks 902a, 902b, 906a, 906b, 904 to be enclosed, and thus sensed, by the second detection loop 1104. As shown, a gap is defined separating the second ferrite block 902a from the third ferrite block 902b, and another gap is defined separating the fourth ferrite block 906a from the fifth ferrite block 906b. These gaps also provide clearance for the second loop 1104 with respect to the first through fourth ferrite blocks 902a, 902b, 906a, 906b such that the second detection loop 1104 is not in physical contact with any of the first through fourth ferrite blocks 902a, 902b, 906a, 906b.

Figure 15A:
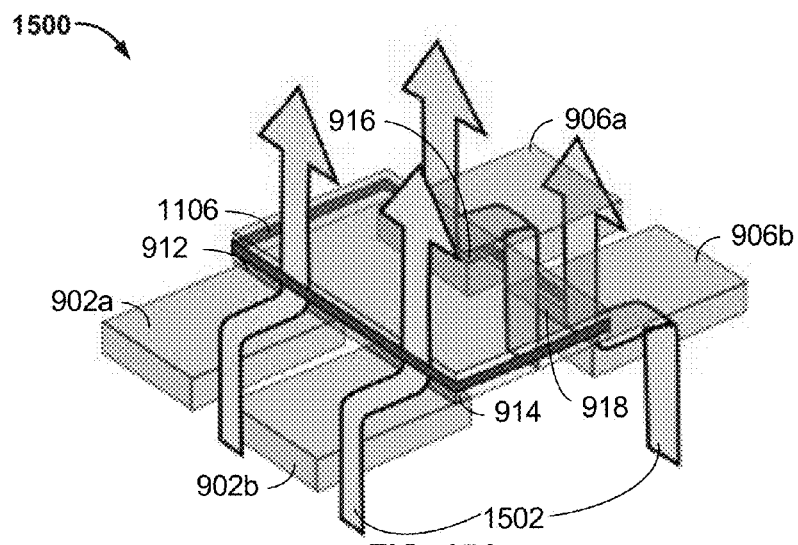
FIG. 15A is an isometric illustration of magnetic flux channeled through the bisected ferrite blocks of FIG. 11 in a Z-direction, detectable by one of the 3 dimensional detection loops of FIG. 11, in accordance with some implementations.

FIG. 15A is an isometric illustration 1500 of magnetic flux 1502 passing through the bisected ferrite blocks 902a, 902b, 906a, 906b of FIG. 11 in a Z-direction, detectable by one of the 3 dimensional detection loops 1106 of FIG. 11, in accordance with some implementations. As shown in FIG. 15, the second ferrite block 902a is in physical contact with the portion 912 of the first ferrite block 904, the third ferrite block 902b is in physical contact with the portion 912 of the first ferrite block 904, the fourth ferrite block 906a is in physical contact with the portion 916 of the first ferrite block 904, and the fifth ferrite block 906b is in physical contact with the portion 918 of the first ferrite block 904. This allows the magnetic flux 1502 (e.g., the Z-component) flowing through each of the first through fifth ferrite blocks 902a, 902b, 906a, 906b, 904 to be enclosed, and thus sensed, by the third detection loop 1106. In FIG. 15A the detection loop 1106 is shown wrapped around each side of the ferrite block 904. As shown, a gap is defined separating the second ferrite block 902a from the third ferrite block 902b, and another gap is defined separating the fourth ferrite block 906a from the fifth ferrite block 906b.

Figure 15B:
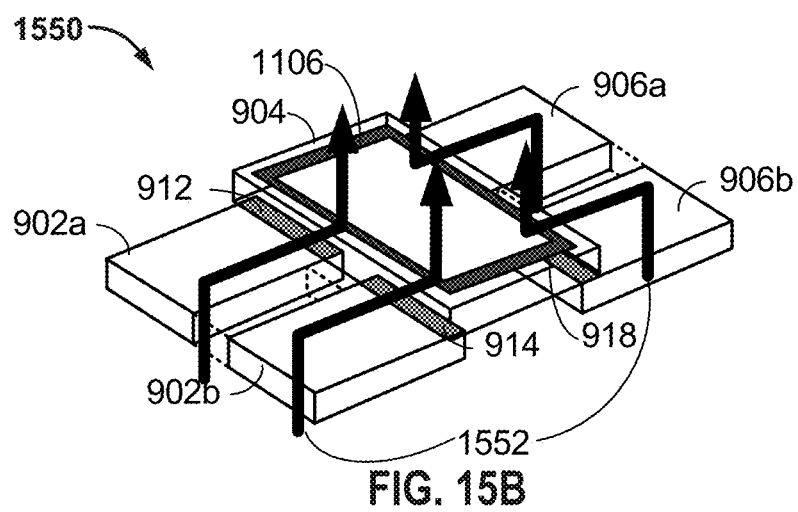
FIG. 15B is another isometric illustration of magnetic flux passing through the bisected ferrite blocks of FIG. 11 in a Z-direction, detectable by one of the 3 dimensional detection loops of FIG. 11, in accordance with some implementations.

FIG. 15B is another isometric illustration 1550 of magnetic flux 1552 passing through the bisected ferrite blocks 902a, 902b, 906a, 906b of FIG. 11 in a Z-direction, detectable by one of the 3 dimensional detection loops 1106 of FIG. 11, in accordance with some implementations. As shown in FIG. 15, the second ferrite block 902a is in physical contact with the portion 912 of the first ferrite block 904, the third ferrite block 902b is in physical contact with the portion 912 of the first ferrite block 904, the fourth ferrite block 906a is in physical contact with the portion 916 of the first ferrite block 904, and the fifth ferrite block 906b is in physical contact with the portion 918 of the first ferrite block 904. This allows the magnetic flux 1502 (e.g., the Z-component) flowing through each of the first through fifth ferrite blocks 902a, 902b, 906a, 906b, 904 to be enclosed, and thus sensed, by the third detection loop 1106. In contrast to that shown in FIG. 15A, the detection loop 1106 in FIG. 15B is shown as being disposed along a perimeter of a top surface of the ferrite block 904, rather than wrapped around each side of the ferrite block 904. As shown, a gap is defined separating the second ferrite block 902a from the third ferrite block 902b, and another gap is defined separating the fourth ferrite block 906a from the fifth ferrite block 906b.

Figure 16:
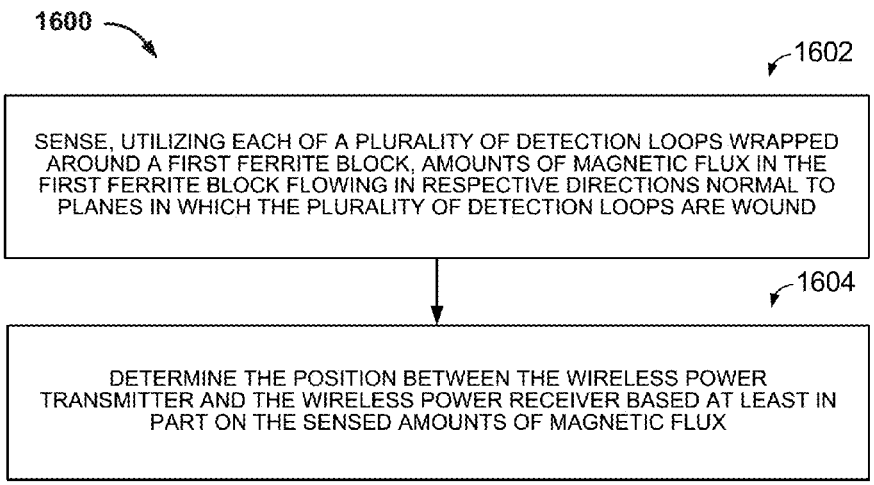
FIG. 16 is a flowchart depicting a method for determining a position between a wireless power transmitter and a wireless power receiver, in accordance with some implementations.

FIG. 16 is a flowchart 1600 depicting a method for determining a position between a wireless power transmitter and a wireless power receiver, in accordance with some implementations. The flowchart 1600 is described herein with reference to at least FIGS. 4-15. Although the flowchart 1600 is described herein with reference to a particular order, in various implementations, blocks herein may be performed in a different order, or omitted, and additional blocks may be added.

Block 1602 includes sensing, utilizing each of a plurality of detection loops wrapped around a first ferrite block, amounts of magnetic flux in the first ferrite block flowing in respective directions normal to planes in which the plurality of detection loops are wound. For example, as previously described in connection with at least FIGS. 4-15, each of a plurality of detection loops 1102, 1104, 1106 wrapped around a first ferrite block 904, may be configured to sense amounts of magnetic flux 1302, 1402, 1502 in the first ferrite block 904 flowing in respective directions normal (e.g., perpendicular) to planes in which the plurality of detection loops are wound (e.g., the Y-Z plane for detection loop 1102 sensing the X-component of the magnetic flux 1302 in FIG. 3, the X-Y plane for detection loop 1104 sensing the Y-component of the magnetic flux 1402 in FIG. 14, and the X-Z plane for detection loop 1106 sensing the Z-component of the magnetic flux 1502 in FIGS. 15A and 15B).

Block 1604 includes determining the position between the wireless power transmitter and the wireless power receiver based at least in part on the sensed amounts of magnetic flux. For example, as previously described in connection with at least FIG. 4-15B a processor or controller may determine the position between the wireless power transmitter and the wireless power receiver based at least in part on the sensed amounts of magnetic flux 1302, 1402, 1502 (or a change in the sensed amount of the magnetic flux 1302, 1402, 1502).

Figure 17:
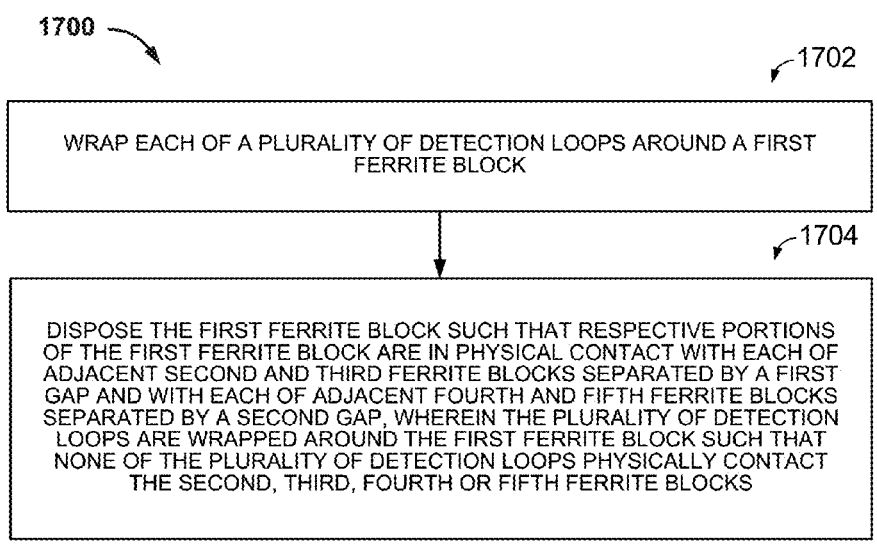
FIG. 17 is a flowchart depicting a method for fabricating determining a position between a wireless power transmitter and a wireless power receiver, in accordance with some implementations.

FIG. 17 is a flowchart 1700 depicting a method for fabricating determining a position between a wireless power transmitter and a wireless power receiver, in accordance with some implementations. The flowchart 1700 is described herein with reference to at least FIGS. 4-15B. Although the flowchart 1700 is described herein with reference to a particular order, in various implementations, blocks herein may be performed in a different order, or omitted, and additional blocks may be added.

Block 1702 includes wrapping each of a plurality of detection loops around a first ferrite block. For example, as previously described in connection with at least FIGS. 4-15, each of a plurality of detection loops 1102, 1104, 1106 are wrapped around a first ferrite block 904.

Block 1704 includes disposing the first ferrite block such that respective portions of the first ferrite block are in physical contact with each of adjacent second and third ferrite blocks separated by a first gap and with each of adjacent fourth and fifth ferrite blocks separated by a second gap, wherein the plurality of detection loops are wrapped around the first ferrite block such that none of the plurality of detection loops physically contact the second, third, fourth or fifth ferrite blocks. For example, as previously described in connection with at least FIG. 4-15B, respective portions 912, 914, 916, 918 of the first ferrite block 904 are in physical contact with each of adjacent second and third ferrite blocks 902a, 902b separated by a first gap and with each of adjacent fourth and fifth ferrite blocks 906a, 906b separated by a second gap. As further described in connection with at least FIGS. 4-15B, the plurality of detection loops 1102, 1104, 1106 are wrapped around the first ferrite block 904 such that none of the plurality of detection loops 1102, 1104, 1106 physically contact the second, third, fourth or fifth ferrite blocks 902a, 902b, 906a, 906b.

Figure 18:
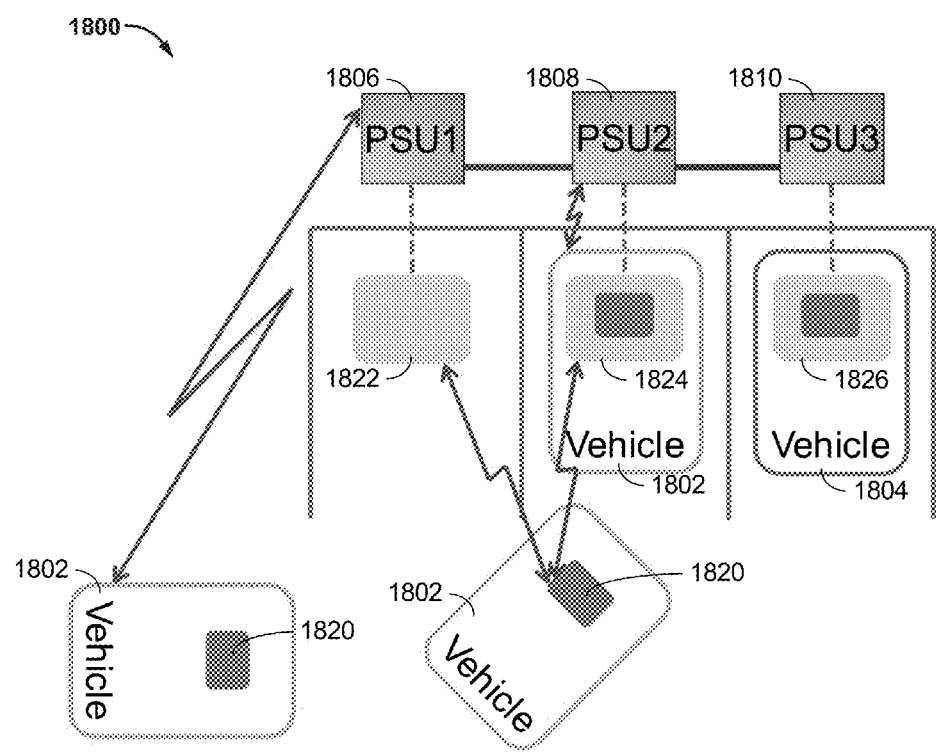
FIG. 18 is a diagram illustrating an alignment of a vehicle pad with a base pad in a parking space, in accordance with some implementations.

FIG. 18 is a diagram 1800 illustrating an alignment of a vehicle pad 1820 with a base pad 1824 in a parking space, in accordance with some implementations. FIG. 18 shows three parking spaces, each outfitted with a respective power supply unit 1806, 1808, 1810 controlling and providing power to a respective base pad 1822, 1824, 1826, respectively. FIG. 18 shows a vehicle 1804 parked in one of the parking spaces over the base pad 1826, which may be configured to receive power from the power supply unit 1810. FIG. 18 additionally shows another vehicle 1802 including a vehicle pad 1820, which may comprise at least a wireless power receiver and a magnetic vectoring apparatus including the plurality of detection coils as previously described. In a connection and discovery action, a connection and discovery protocol between the vehicle 1802 and one of the power supply units 1806, 1808 serving a vacant parking space may take place. Once discovery has occurred and a wireless communication connection (e.g., an 802.11n connection) is made, the vehicle 1802 may direct the power supply unit 1808, for example, to listen for magnetic vectoring beacons transmitted by the vehicle pad 1820.

In a positioning action, the vehicle pad 1820 transmits the magnetic vectoring beacon. The base pad 1824 may receive the beacon and transmits a determined or calculated distance and angle between the base pad 1824 and the vehicle pad 1820 via the previously established wireless communication connection. This distance and angle information is continuously or periodically updated and transmitted by the base pad 1824 to the vehicle pad 1820 as the vehicle approaches the base pad 1824. In the alternative, the charging station may receive one more beacons and transmit raw field measurement data via the 802.11n communication connection to the vehicle. In such alternative implementations, the vehicle 1802 may calculate the angle and distance based on this raw field measurement data. The driver of the vehicle 1802 may access this information via a user interface (not shown) within the vehicle 1802. Once alignment or near alignment has been achieved, the vehicle 1802 and the base pad 1824 (or power supply unit 1808) may wirelessly pair with one another.

In a charging action, charging information may be communicated between the vehicle 1802 and the base pad 1824 or power supply unit 1808 via a wireless communication connection (e.g., an 802.11n connection).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted as one or more instructions or code on a tangible, non-transitory, computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for determining a position between a wireless power transmitter and a wireless power receiver, comprising:
    a first ferrite block having respective portions configured to be disposed in physical contact with each of adjacent second and third ferrite blocks separated by a first gap and with each of adjacent fourth and fifth ferrite blocks separated by a second gap; and
    a plurality of detection loops wrapped around the first ferrite block such that none of the plurality of detection loops physically contact the second, third, fourth or fifth ferrite blocks when the respective portions of the first ferrite block are in physical contact with the second, third, fourth or fifth ferrite blocks.

2. The apparatus of claim 1, wherein each of the plurality of detection loops are wrapped around the first ferrite block in mutually perpendicular planes.

3. The apparatus of claim 1, wherein one of the plurality of detection loops is wrapped between the respective portions of the first ferrite block configured to be disposed in physical contact with each of the second and third ferrite blocks.

4. The apparatus of claim 1, wherein one of the plurality of detection loops is wrapped between the respective portions of the first ferrite block configured to be disposed in physical contact with each of the fourth and fifth ferrite blocks.

5. The apparatus of claim 1, wherein magnetic flux flowing through each of the second, third, fourth and fifth ferrite blocks is transmitted through the first ferrite block via the respective portions of the first ferrite block.

6. The apparatus of claim 1, wherein each of the plurality of detection loops is configured to sense an amount of magnetic flux flowing in a respective direction normal to a plane in which the respective detector loop is wound.

7. The apparatus of claim 1, wherein a first wireless power transfer coil is wrapped on or around the adjacent second and third ferrite blocks.

8. The apparatus of claim 1, wherein a second wireless power transfer coil is wrapped on or around the adjacent fourth and fifth ferrite blocks.

9. The apparatus of claim 1, wherein one of the plurality of detection loops is disposed along a perimeter of a top surface of the first ferrite block.

10. The apparatus of claim 1, wherein each of the plurality of detection loops are wrapped around the first ferrite block in differently oriented planes.

11. A method for determining a position between a wireless power transmitter and a wireless power receiver, comprising:
    sensing, utilizing each of a plurality of detection loops wrapped around a first ferrite block, amounts of magnetic flux in the first ferrite block flowing in respective directions normal to planes in which the plurality of detection loops are wound, and
    determining the position between the wireless power transmitter and the wireless power receiver based at least in part on the sensed amounts of magnetic flux,
        wherein the first ferrite block comprises respective portions configured to be disposed in physical contact with each of adjacent second and third ferrite blocks separated by a first gap and with each of adjacent fourth and fifth ferrite blocks separated by a second gap; and
        wherein the plurality of detection loops are wrapped around the first ferrite block such that none of the plurality of detection loops physically contact the second, third, fourth or fifth ferrite blocks when the respective portions of the first ferrite block are in physical contact with the second, third, fourth or fifth ferrite blocks.

12. The method of claim 11, wherein each of the plurality of detection loops are wrapped around the first ferrite block in mutually perpendicular planes.

13. The method of claim 11, wherein one of the plurality of detection loops is wrapped between the respective portions of the first ferrite block configured to be disposed in physical contact with each of the second and third ferrite blocks.

14. The method of claim 11, wherein one of the plurality of detection loops is wrapped between the respective portions of the first ferrite block configured to be disposed in physical contact with each of the fourth and fifth ferrite blocks.

15. The method of claim 11, wherein magnetic flux flowing through each of the second, third, fourth and fifth ferrite blocks is transmitted through the first ferrite block via the respective portions of the first ferrite block.

16. The method of claim 11, further comprising inductively transferring power via a first wireless power transfer coil wrapped on or around the adjacent second and third ferrite blocks.

17. The method of claim 11, further comprising inductively transferring power via a second wireless power transfer coil is wrapped on or around the adjacent fourth and fifth ferrite blocks.

18. A method for fabricating an apparatus for determining a position between a wireless power transmitter and a wireless power receiver, the method comprising:
    wrapping each of a plurality of detection loops around a first ferrite block; and
    disposing the first ferrite block such that respective portions of the first ferrite block are in physical contact with each of adjacent second and third ferrite blocks separated by a first gap and with each of adjacent fourth and fifth ferrite blocks separated by a second gap,
        wherein the plurality of detection loops are wrapped around the first ferrite block such that none of the plurality of detection loops physically contact the second, third, fourth or fifth ferrite blocks.

19. The method of claim 18, wherein each of the plurality of detection loops are wrapped around the first ferrite block in mutually perpendicular planes.

20. The method of claim 18, wherein one of the plurality of detection loops is wrapped between the respective portions of the first ferrite block configured to be disposed in physical contact with the second and third ferrite blocks.

21. The method of claim 18, wherein one of the plurality of detection loops is wrapped between the respective portions of the first ferrite block configured to be disposed in physical contact with the fourth and fifth ferrite blocks.

22. The method of claim 18, further comprising wrapping a first wireless power transfer coil on or around the adjacent second and third ferrite blocks.

23. The method of claim 18, further comprising wrapping a second wireless power transfer coil on or around the adjacent fourth and fifth ferrite blocks.

24. The method of claim 18, wherein one of the plurality of detection loops is wound along a perimeter of a top surface of the first ferrite block.

25. An apparatus for determining a position between a wireless power transmitter and a wireless power receiver, comprising:
   first means for channeling magnetic flux having respective portions configured to be disposed in physical contact with each of adjacent second and third means for channeling magnetic flux separated by a first gap and with each of adjacent fourth and fifth means for channeling magnetic flux separated by a second gap; and
   a plurality of means for detecting magnetic flux wrapped around the first means for channeling magnetic flux such that none of the plurality of means for detecting magnetic flux physically contact the second, third, fourth or fifth means for channeling magnetic flux when the respective portions of the first means for channeling magnetic flux are in physical contact with the second, third, fourth or fifth means for channeling magnetic flux.

26. The apparatus of claim 25, wherein each of the plurality of means for detecting magnetic flux are wrapped around the first means for channeling magnetic flux in mutually perpendicular planes.

27. The apparatus of claim 25, wherein one of the plurality of means for detecting magnetic flux is wrapped between the respective portions of the first means for channeling magnetic flux configured to be disposed in physical contact with each of the second and third means for channeling magnetic flux.

28. The apparatus of claim 25, wherein one of the plurality of means for detecting magnetic flux is wrapped between the respective portions of the first means for channeling magnetic flux configured to be disposed in physical contact with each of the fourth and fifth means for channeling magnetic flux.

29. The apparatus of claim 25, wherein a first wireless power transfer coil is wrapped on or around the adjacent second and third means for channeling magnetic flux and a second wireless power transfer coil is wrapped on or around the adjacent fourth and fifth means for channeling magnetic flux.

30. The apparatus of claim 25, wherein one of the plurality of means for detecting magnetic flux is disposed along a perimeter of a top surface of the first means for channeling magnetic flux.

* * * * *